July 19, 1955  E. G. RAGATZ  2,713,478
APPARATUS FOR COUNTER-CURRENT CONTACTING OF LIQUIDS AND VAPORS
Filed Oct. 3, 1952  2 Sheets-Sheet 1

INVENTOR
Edward G. Ragatz

BY Burns, Doane & Benedict
ATTORNEYS

July 19, 1955 E. G. RAGATZ 2,713,478
APPARATUS FOR COUNTER-CURRENT CONTACTING OF LIQUIDS AND VAPORS
Filed Oct. 3, 1952 2 Sheets-Sheet 2

INVENTOR
*Edward G. Ragatz*

BY *Burns, Doane + Benedict*
ATTORNEYS united States Patent Office 2,713,478
Patented July 19, 1955

2,713,478

APPARATUS FOR COUNTER-CURRENT CONTACTING OF LIQUIDS AND VAPORS

Edward G. Ragatz, San Marino, Calif., assignor to Edw. G. Ragatz Co., San Marino, Calif., a partnership Application October 3, 1952, Serial No. 312,933

7 Claims. (Cl. 261—114)

This invention relates to apparatus for counter-current contacting of liquids and vapors for effecting component interchange, such as occurs in distillation and absorption columns, or the like. It is more specifically concerned with perforated-plate tray construction and operation, useful particularly in the petroleum field.

This application is a continuation-in-part of my copending application Serial Number 255,807, filed November 10, 1951.

Conventional columns for distillation, absorption and the like are commonly constructed with super-imposed, spaced trays designed to conduct liquids in a zigzag course downward through the column while admitting gases upwardly into horizontally flowing portions of the liquid for intimate counter-current contacting therewith. The majority of such columns employ some form of "bubble cap" tray construction to effect this vapor-liquid contact. Such trays are generally heavy and complicated in design and hence more expensive, particularly when constructed of alloy steel for combating corrosion, and tend to be relatively inefficient when heavily loaded.

Relatively simple perforated-plate type columns have been used to some extent looking to reduction in tray costs. Such trays, however, have also tended to be inefficient when handling higher loads involving large flowing liquid to vapor volume ratios wherein the residence times of the liquid carried on the tray are relatively short.

In both the "bubble cap" and "perforated plate" tray designs the cross-flowing liquid constitutes the continuous phase, and the uprising vapors the discontinuous phase, in the contacting zone wherein desired interchange of components between vapors and liquid takes place. In this operation the discontinuous vapor phase is broken up into small-diameter bubbles which serve to present a large component interchange surface within the contacting zone, and wherein the molecular activity of the vapor phase results in rapid and relatively easy access of the vapor molecules to the said component-interchange surface. On the other hand, molecules in the continuous liquid phase, "on the average," must travel a greater distance than the vapor molecules to reach the interchanging surface, and at the same time find such travel much more difficult due to their lower molecular activity. As a result, whereas satisfactory molecular transfer through the gas phase can be effected with an extremely short residence time of the gas phase in the contacting zone, large tray residence times are required by the oil phase if the tray is to operate at high efficiency. These large residence times, in turn, seriously reduce the capacity of the conventional high-efficiency tray— particularly when handling large flowing oil to gas volume ratios.

It is the general object of the invention to provide a vapor-liquid contacting tray structure which increases the tray capacity at high efficiency (particularly under conditions of high flowing liquid to vapor volume ratios) by utilizing tray features which break up the gas phase into smaller diameter bubbles with a consequent increasing of the component interchange surface, and which utilize potential velocity energy of the up-flowing gas to both increase the residence time of the liquid on a tray for a given tray capacity, and to more effectively agitate said liquid whereby the mean path-of-travel of liquid molecules to the component interchanging surface is reduced.

The structure provided by the present invention contemplates a column having a vertically disposed tubular body with one or more manholes and having suitable fluid-handling ducts connected to it. A plurality of horizontal contacting trays are provided in the body in spaced relation one above the other and alternately disposed in the manner common to absorption and distillation column construction so that liquid can be introduced into the upper portion of the body and follow a zigzag course as it passes down through the body and over the trays in counter-circuit contact with an upflowing vapor stream.

In accordance with the present invention, the said contacting trays in the column may be alike, each being characterized by a horizontally disposed plate located in the body and having a liquid flow-receiving portion anchored at one side of the body and a detachably secured main portion extending from the flow-receiving portion across the body to a point adjacent to the opposite side of the body. An overflow weir projects up from the tray at the downstream edge, and an apron depends downwardly from the weir in the manner common to bubble-column construction. A plurality of detachable coalescing weir units are located on the tray between the flow-receiving portion of the plate and the overflow weir. These weir units are elongate elements, separated horizontally, and positioned substantially parallel with each other transverse the flow of liquid across the tray. Each weir unit may consist of a horizontal plate section blanking off a portion of the perforated-plate area to vapor flow, with a vertical weir attached to the downstream elongate edge of said plate. Alternatively, the tray may comprise a plurality of alternating perforate and imperforate sections extending transverse the flowing liquid stream, having vertical weirs on or near the downstream edges of the imperforate sections, all extending from shell wall to shell wall between the flow-receiving and overflow-weir portions of the plate.

In accordance with the present invention, the liquid flow-receiving portion of the plate, the overflow weir, and the depending apron, may be permanently anchored in the body, for example, by welding, thus establishing a permanent rigid unit to which the main tray sections and weir units may be removably attached.

In accordance with the invention, the "active" or liquid-vapor contacting portions of the plate in which the gas-handling perforations are located, are arranged to extend from the liquid flow-receiving portion of the tray to the liquid overflow weir, being attached to the weir units with fastening means releasably retaining the main portion of the tray and weir units in operating position. Further, the invention contemplates that the main perforated portion of the tray be sectional, that is, formed of a plurality of separable sections, and these sections may extend either parallel with the weirs or transversely thereof and may be simple, flat, sheet-metal elements, or they may be elements provided with reinforcing flanges as hereinafter described. The main portion of the tray is provided with perforations, and in accordance with the invention, the perforated portions of the plate are of thin or light-gauge sheet metal. The perforations are large in diameter relative to the thickness of the plate, for example, they may be of a diameter equal to at least three times the thickness of the plate.

In one typical construction, vertical weirs are attached to the blanking strips on or adjacent the downstream elongate edges thereof. These weirs are preferably provided with small ports at the bottom, adjacent the main tray level, so dimensioned that a small portion of the cross-moving coalesced liquid flows through them to the next adjacent downstream perforate section. The remainder of the coalesced liquid flows in a generally reverse direction to the adjacent upstream perforated section, and the thus recycled liquid is again contacted with rising gas or vapor. A part of the frothy liquid, from which the gas may be partially disengaged, flows across the upper edge of the submerged weirs. With this construction, frothy liquid moving across a blanked or imperforate section from an agitated liquid-vapor contacting zone above a free perforated-plate section, is partially coalesced, and a major portion of said coalesced liquid is recycled back into the previously traversed zone of agitation-contact with ascending vapors. At the same time, "eddy" action in the angle formed by the weir and the imperforate section, which would trap and hold "dead" liquid on the blanking-plate section, is destroyed by the forward escape of such trapped liquid through the aforementioned restricted ports.

In some operations, particularly hydrocarbon gas absorption, a second liquid phase may be present. Water is usually present, and in some cases a liquid dehydrating agent such as one of the glycols is added. These "second phase" liquids are heavier than the liquid hydrocarbons, and tend to build up in the coalescing zone by eddy action. With provision for a restricted forward movement of liquid through the weirs, their movement across the trays and through the column is hastened, and build-up is prevented. This is another advantage of the apparatus.

According to another embodiment, vertical vapor-confining baffles are interposed upstream of and substantially parallel to the weirs, and positioned over the imperforate sections, with a passageway therebetween through which coalesced liquid flows to the adjacent upstream contacting zone. These are preferably spaced vertically from the plate and sufficiently inwardly from its upstream edge so that upwardly rising vapors are deflected to a substantially vertical upward path from the perforate section of the tray upstream of the baffle. The baffle may be attached to and supported by the weir by spacers or brackets at the weir ends and such intermediate points as may be necessary. Any other suitable means for their support may be used, however.

In this modified structure the frothy liquid moves over the top of the baffle. Because the vapors are confined to a more nearly vertical path and the coalescing zone is larger and relatively more quiet than in the structure previously described, gas-disengagement and liquid-coalescence are improved over the structure in which the secondary baffle is not used. The coalesced, more or less vapor-free liquid, being denser than the froth, flows down onto the plate and across it to the adjacent upstream perforate section in relatively larger amounts, and hence the residence time of the liquid flow across the plate is increased and plate capacity and efficiency is increased. The confining and directionalizing effect of the baffle provides a more restricted liquid-vapor contacting zone, with resultant increased turbulence therein, which still further improves efficiency of component interchange because of improved contact between gas and liquid.

Figure 1:
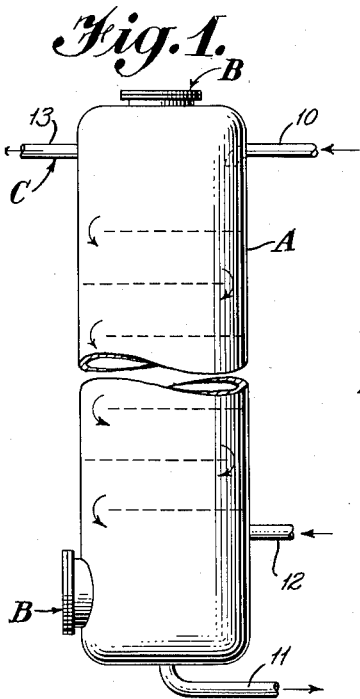
Figure 1 is a general or schematic view of a column showing the vertical tubular body with manhole fittings and piping, the arrangement of trays, and the general flow of liquid from top to bottom and vapor upwardly counter-current to the liquid.

Referring to Figure 1 the column will be described in terms of an absorption column. It comprises a shell A and the usual covered manholes B. A pipe 10 provides an inlet for a suitable absorption medium such as absorption oil or the like, by which the oil is introduced into the top of the absorption column and flows downwardly over a series of liquid-vapor contacting plates in the directions generally indicated by the arrows. Enriched absorption oil is withdrawn from the column through line 11 to suitable stripping columns for recovery of the absorbed materials. A gas from which desired components are to be absorbed, for example, propane and heavier fractions mixed with lower-boiling gases, may be introduced through line 12 below the bottom plate. The lean gas is withdrawn near the top of the column through line 13.

As will be seen from the hereinafter described modifications of the invention, the absorption oil is deposited on the top plate and flows in a horizontal direction across the top tray, then through a downcomer onto the next plate, flowing horizontally across it to the opposite side of the column, and proceeds thus downwardly until it reaches the point from which it is withdrawn. The gases being treated pass up vertically through perforations in the trays, contacting the absorption medium in the manner hereinafter described and ultimately being withdrawn from the tower at the top.

Figure 2:
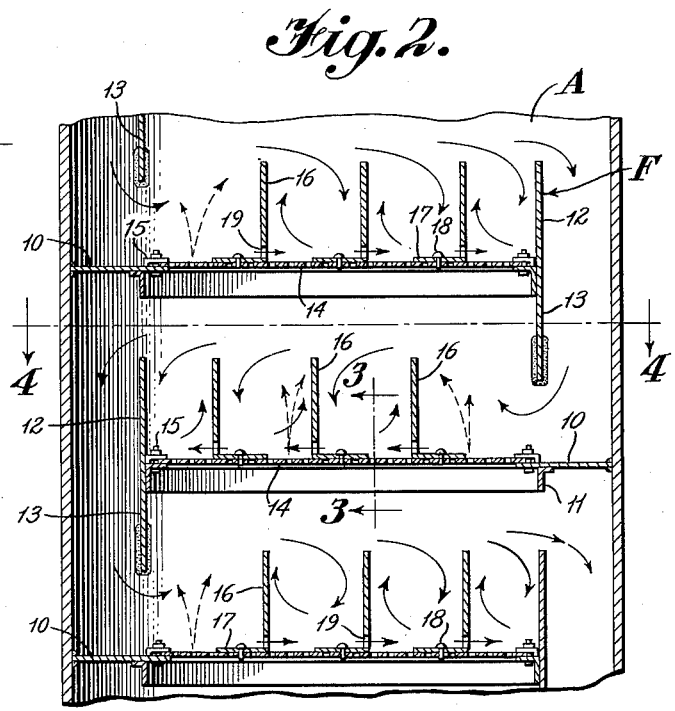
Figure 2 is a vertical section of the column and tray assembly showing several successive trays within the body of the column.
Figure 3:
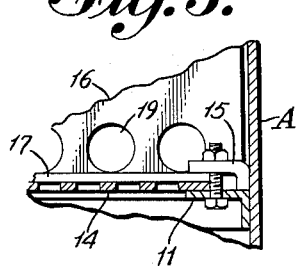
Figure 3 is a detailed sectional view along the line 2—2 of Figure 2.
Figure 4:
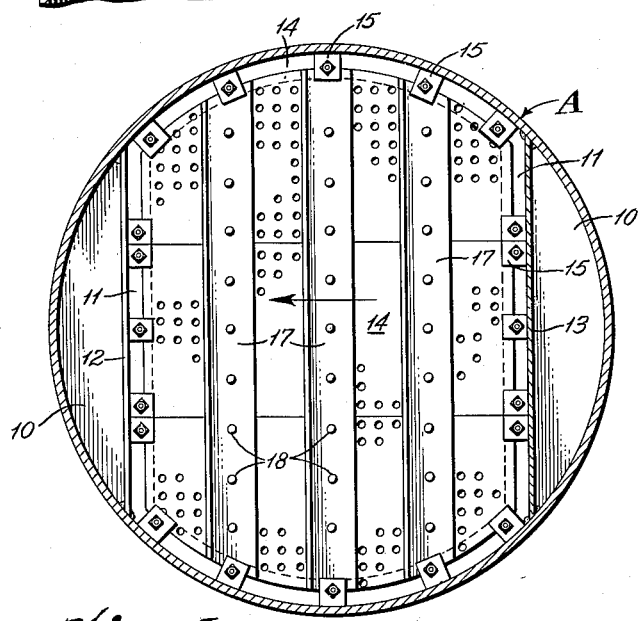
Figure 4 is a plan view of the tray arrangement taken along the line 4—4 of Figure 2.

Referring to Figure 2, the column A comprises the usual vertical shell made of steel or other suitable material. The column is equipped with trays which may be supported by the angles 11 attached to the column shell and plates 10 and 13. A downcomer is provided which, as illustrated, comprises an off-flow weir 12 and apron 13. The liquid flows over the off-flow weir 12 and down between the space formed by the weir 12 and the apron 13 to the on-flow plate 10 of the tray below. The tray proper comprises a perforated plate 14, which may extend over the entire absorption area and be preferably constructed of removable sections as illustrated in Figure 4. These sections are of dimensions suitable for insertion through the manholes. The perforated sections may be supported by angles 11 and held in place by clips 15. Disposed upon the perforated tray is a plurality of weir units 16. These weir units are shown in the form of sheet-metal L's. The bottom portion of the L, designated as 17, rests upon and is attached to angles 11 by clips 35 as shown in Figure 4. The bottom portion 17 of the weir unit is not perforated and therefore covers and blanks off a portion of the perforations. At the lower edge of the initial weirs 16 are a plurality of small openings 19 which permit a small portion of the liquid on the trays to flow thereunder as indicated by the arrows. The vertical weirs 16 may be of the same height as the off-flow weir 12.

If the perforated-plate sections 14 are sufficiently thick, and the diameter of the column not too great, the said sections may be satisfactorily supported by angles 11 alone. On the other hand, in cases where it is desired to use extra thin perforated plates, or employ plate sections without auxiliary angle supports in large diameter columns, then the overlying weir units 16 may be employed to give additional support to the perforated-plate sections of the tray. This support may employ rivets or screws of any suitable character by which the perforated plate may be attached, at intermediate points, to the overlying weir units as illustrated by rivet 18 of Figure 2.

It will be thus noted that the tray section proper comprises an alternating perforate and imperforate or blanked-out section between each of the vertical weirs, there being a perforate section between the last intermediate weir and the tray off-flow weir. There is a perforate section and then an imperforate section between the on-flow plate and the first intermediate weir. The web or blanking strip 17 extends the full width of the tray. The alternating perforate and imperforate sections, as well as the weirs 16, are positioned transverse the flow of liquid across the trays.

The construction just described is easy to construct and assemble. It has the added advantage, when using thin perforated-plate sections, that the perforated sections can be attached to the blanking strips for support and reinforcement as above described.

However, the tray proper can also be made of alternating sections of perforated and solid sheets if desired, in which case the blanking strips 17 are not needed. The vertical weirs in such case need not be attached to the tray bottom but may be supported from the shell. All supporting and fastening means for tray sections and weirs are preferably of a type permitting assembly and disassembly of the trays within the column. This facilitates construction, as well as replacement or repairs.

With the construction shown, the liquid flow over the tray is substantially as indicated by the arrows in Figure 2, i. e., one in which the majority of the liquid crossing the tray flows in turn over zones of agitation-contact with ascending vapors above "free" sections of perforated plate, thence over contiguous gas-disengaging and liquid-coalescing zones above the blanking strips (i. e., zones from which the ascending vapor stream is excluded) and then over a weir into another zone of agitation. From the coalescing zone, however, a substantial volume of semi-coalesced liquid recycles backward into the previously traversed zone of agitation-contact, while a small volume of semi-coalesced liquid escapes through the limited-capacity weir ports directly into the next adjacent downstream zone of agitation. As a result of this "recycle" method of liquid flow, the contacting efficiency and capacity of the tray is materially increased in that:

1. The repeated coalescing and refrothing of the liquid crossing the tray brings a maximum of fresh liquid surfaces into contact with the rising vapor stream in each liquid-vapor contacting zone.
2. The vapor streams issuing from the individual tray perforations are jetted into a more dense liquid mass resulting in a greater diffusion of smaller vapor bubbles in said liquid mass.
3. The entire volume of the coalescing zones is employed in coalescing fresh liquid by elimination of "eddy" action tending to trap and hold "dead" liquid on the tray.
4. Water or other immiscible liquid is prevented from accumulating in the coalescing zone and is moved continuously and uniformly across the tray.

Figure 5:
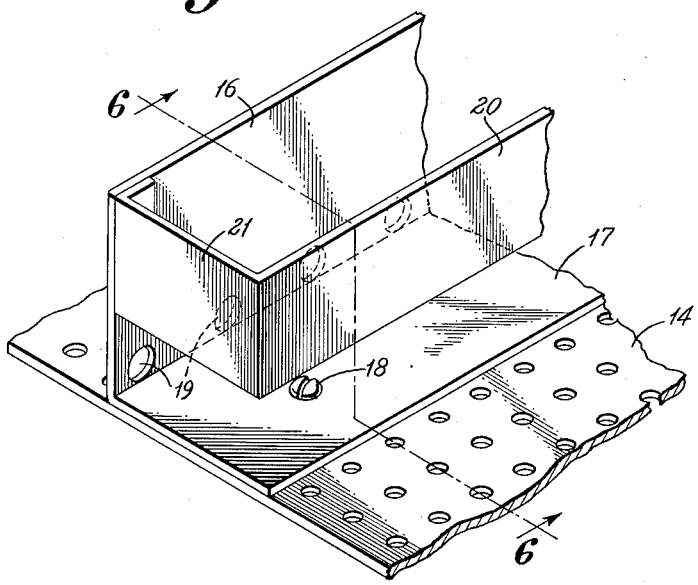
Figure 5 is a perspective view of a modification of the invention employing a vapor-confining baffle.
Figure 6:
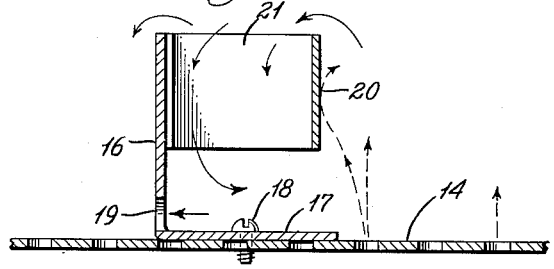
Figure 6 is an end view of the modification shown in Figure 5.

Referring to Figures 5 and 6, a gas-deflecting baffle such as that shown at 20 is provided to increase both the effective coalescing-zone volume ahead of the weir 16 and the turbulence action in the associated liquid-vapor contacting zone. The baffle 20 comprises a vertical section substantially parallel to the weir 16 and spaced from it by means of the spacing arm 21, which in turn may be attached to weir 16 by bracket 22. Additional spacing and supporting elements may be provided if necessary. Numerous other methods of supporting the gas-confining baffle will be readily apparent to one skilled in the art. The baffle 20 may be located with the top edge at about the same height as the top of weir 16. As will be noted, the baffle 20 is preferably inserted between the upstream edge of the blanking plate 17 and the weir 16. A passage is provided under baffle 20 so as to permit coalesced liquid to flow freely under the baffle and onto the adjacent upstream perforate section of the tray 14. The gases or vapors passing through the perforations of plate 14 in a vertical direction jet into the liquid thereover, forming it into a froth. This frothy liquid flows in the general direction indicated by the arrows in Figure 6. In crossing over the top of baffle 20, a portion of the froth (representing the major portion of the "net" cross-flowing liquid volume) passes on across weir 16, while a substantial balance drops into the gas-disengaging, liquid-coalescing zone formed between baffle 20 and baffle 16 to be coalesced therein and recycled as previously described. The fact that the baffle 20 is generally located between the weir 16 and the upstream edge of plate 17, insures that little or none of the vertically rising gas will pass into the space between the weir and the baffle and adversely affect the desired coalescing action therein.

By employing the construction hereinabove described, it is practical to form the main portion of the plate 14 of a very thin or light-gauge sheet metal, preferably comprising a plurality of separable sections. In the particular case under consideration, these sections extend in the direction that the main portion of the plate extends, i. e., from the on-flow plate 10 to the off-flow weir 12. By forming the lower tray portion of a suitable number of separable sections, these sections can be easily inserted into or removed from the body A through manholes B, as circumstances require.

In accordance with the construction provided by the present invention, it is practical to form plate 14 of sheet metal of about 20-gauge or even thinner. The perforations may be of a diameter about three times or more the thickness of the plate, say for example, one-eighth inch or more. In practice, the ratio of plate thickness to perforation diameter is such that flow of gas will occur through the perforations without establishing pockets or eddying currents within the perforations proper, thereby eliminating or minimizing accumulation or build-up of solids which restrict and often plug the holes in perforated plates of conventional design. This is a highly important factor, since, in accordance with the tray construction heretofore provided, the relationship of tray thickness to perforation size has been such that pockets or eddying currents have occurred in the perforations, allowing solid material to deposit or build up and finally restrict and possibly choke off the flow of gas.

With tray construction heretofore employed, it has been necessary that the main or perforate portions of the tray be of substantial thickness, and under usual conditions the size of the perforations is limited and consequently the choking action referred to has been inevitable. I have provided a structure which, when assembled into tray units, may be effectively reinforced and supported as previously described so as to permit use of very light and thin-gauge metal.

Figure 7:
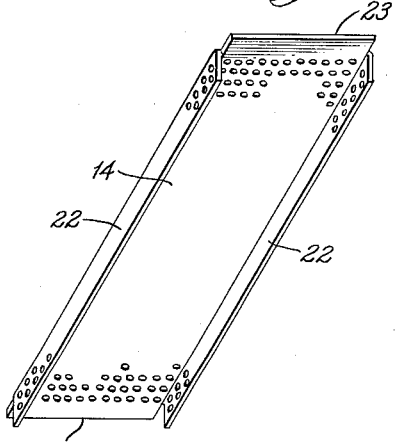
Figure 7 is a perspective view of a section of the main portion of the plate according to one modification.
Figure 8:
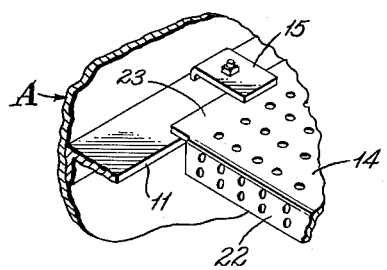
Figure 8 is a detail of construction which may be used when the tray modification shown in Figure 7 is employed.

The main portion of the tray may be formed of perforated sections generally extending across the column traverse the direction of flow of the liquid stream, as illustrated in Figure 4 of the drawings. As described, these may be flat perforated plates. In an alternative form of the invention, shown in Figures 7 and 8, the perforated-plate sections of the column tray are reinforced by downwardly depending flanges 22. The reinforced plate sections are provided with lips 23 from which the depending flanges are omitted to provide each plate section with support at each end for resting on angles 11. The side sections of the perforated plate 14 which overlap the angles 11 and are supported thereby, are not flanged. The sections are removably attached to angles 11, for example, by clips 15.

During operation, the pressure component tending to shift the perforated plate section 14 is upward, due to the differential pressure required to force the upflowing vapors through the tray perforations and liquid froth overlying the tray. Consequently, by stiffening the perforated-plate sections with reinforcing flanges 22 whereby they are properly self-supporting when the column is idle, and "backing them up" with stiffening weir units when in operation, need for physically attaching the perforated-plate sections to the baffle units as with means 18 of Figure 2 may be eliminated. In other particulars, the construction shown is as previously described.

Having described only typical preferred forms and applications of my invention, I do not wish to be limited or restricted to the specific details herein set forth, but wish to reserve to myself any variations or modifications that may appear to those skilled in the art and fall within the scope of the following claims:

I claim:

1. A liquid-vapor contacting apparatus of the character described comprising a horizontal column tray across which liquid flows including, a thin perforate plate, blanking plates located over the perforate plate transverse the liquid flow, and vertical weirs paralleling and attached to the blanking plates forming barriers between the blanking plates and the adjacent downstream free perforated plate sections, said weirs and blanking plates forming vapor-disengaging and liquid-coalescing zones between perforate plate sections whereby a portion of the cross-flowing liquid is coalesced and caused to recycle back into an adjacent upstream liquid-vapor contacting zone.

2. The apparatus of claim 1 wherein vertical vapor-deflecting baffles are interposed upstream of and substantially parallel to said weirs, and over which baffles frothy liquid flows from an adjacent upstream contacting zone into a vapor-disengaging zone, and under which baffles coalesced liquid is recycled back to said adjacent upstream contacting zone.

3. The apparatus of claim 1 including restricted liquid passages between said coalescing zone and the adjacent down-stream contacting zone, whereby a portion of said coalesced liquid is transferred from said coalescing zone to said adjacent down-stream contacting zone.

4. A vapor-liquid contacting apparatus of the character described comprising a horizontal column tray across which liquid flows through a plurality of alternating vapor-liquid contacting and vapor-disengaging zones, said tray comprising a plurality of vapor-admitting means disposed in sections lying transverse the flow of the liquid and through which vapors flow upwardly forming vapor-liquid contacting zones, horizontal vapor-excluding tray sections immediately down-stream thereof and parallel to said contacting zones, vertical weirs on the down-stream sides of said horizontal vapor-excluding sections interposed between said vapor-excluding sections and adjacent down-stream vapor-liquid contacting sections, said horizontal vapor-excluding sections and said weirs forming vapor disengaging and liquid-coalescing zones, vertical vapor-deflecting baffles interposed upstream and substantially parallel to said weirs over which baffles frothy liquid flows from an adjacent upstream contacting zone into a vapor-disengaging zone, and under which baffles coalesced liquid is recycled back to said adjacent upstream zone.

5. A vapor-liquid contacting apparatus of the character described comprising a plurality of superimposed horizontal trays across the individual trays of which liquid flows through alternating vapor-liquid contacting and vapor-disengaging zones, said individual trays comprising a plurality of perforate tray-sections lying transverse the flow of the liquid through which vapors jet upwardly forming vapor-liquid contacting zones thereabove, a plurality of imperforate tray-sections lying immediately downstream therefrom and parallel to said perforate sections, and vertical weirs on the downstream sides of said imperforate sections forming barriers between said imperforate sections and adjoining down-stream perforate sections of said tray, said imperforate sections and said weirs forming vapor-disengaging and liquid-coalescing zones between perforate sections whereby a portion of the cross-flowing frothy liquid from an adjacent upstream contacting zone is coalesced and caused to recycle back into said adjacent upstream contacting zone, and vertical vapor-deflecting baffles interposed upstream and substantially parallel to said weirs over which baffles frothy liquid flows from an adjacent upstream contacting zone into a vapor-disengaging zone, and under which baffles coalesced liquid is recycled back into said adjacent upstream contacting zone.

6. The apparatus of claim 4 including liquid passages through said weirs whereby coalesced liquid is transferred from said coalescing zones into the lower sections of said adjacent downstream contacting zones.

7. The apparatus of claim 5 including liquid passages through said weirs whereby coalesced liquid is transferred from said coalescing zones into the lower sections of said adjacent downstream contacting zones.

References Cited in the file of this patent

UNITED STATES PATENTS

| 337,446 | Scott et al. | Mar. 9, 1886 |
| 1,811,247 | Smith | June 23, 1931 |
| 2,085,522 | Baars | June 29, 1937 |
| 2,116,933 | Ragatz | May 10, 1938 |
| 2,610,046 | Collins | Sept. 9, 1952 |

FOREIGN PATENTS

| 429 | Austria | Oct. 25, 1899 |
| 569,039 | Great Britain | May 2, 1945 |